(12) United States Patent
Mortarotti

(10) Patent No.: US 6,788,451 B2
(45) Date of Patent: Sep. 7, 2004

(54) METHOD FOR OBTAINING A PRINTED PRODUCT WITH VISUAL EFFECTS, AND PRINTED PRODUCT

(76) Inventor: Marcelo E. Mortarotti, Parera 12, Piso 3o, Buenos Aires (AR), 1014

( * ) Notice: Subject to any disclaimer, the term of this patent is extended or adjusted under 35 U.S.C. 154(b) by 0 days.

(21) Appl. No.: 10/241,545

(22) Filed: Sep. 11, 2002

(65) Prior Publication Data

US 2004/0047024 A1 Mar. 11, 2004

(51) Int. Cl.[7] .............................................. G02B 26/00
(52) U.S. Cl. ............................. 359/296; 430/14; 283/70
(58) Field of Search ............................. 359/296; 430/9, 430/11, 14; 283/70

(56) References Cited

U.S. PATENT DOCUMENTS

| | | | | |
|---|---|---|---|---|
| 4,269,916 A | * | 5/1981 | Bilofsky et al. | 430/11 |
| 6,440,277 B1 | * | 8/2002 | D'Amato | 204/192.15 |
| 6,544,714 B1 | * | 4/2003 | Bourdelais et al. | 430/263 |

* cited by examiner

Primary Examiner—Scott J. Sugarman
Assistant Examiner—Richard Hanig
(74) Attorney, Agent, or Firm—Fulbright & Jaworski L.L.P.

(57) ABSTRACT

A printed product including an image with visual effects and a method for obtaining the printed product, the method comprising providing a photographic image, printing the image on a front transparent sheet and adhering the transparent sheet to a light-reflecting front surface of a back support sheet for providing a visual effect resulting from the combination of the light-reflecting surface and the image.

24 Claims, 4 Drawing Sheets

METHOD FOR OBTAINING A PRINTED PRODUCT WITH VISUAL EFFECTS, AND PRINTED PRODUCT

BACKGROUND OF THE INVENTION

1. Field of the Invention

The present invention relates to a method for obtaining a printed product including an image with visual effects wherein the image is obtained by conventional photographic techniques and more particularly the invention refers to a printed product and a method for obtaining visual or optical effects in a printed product containing an image preferably obtained by one or more photographic exposures, pictures, TV image, etc., wherein the image is affected by visual effects providing different views from different positions of the viewer, as well as different depths of field, light intensities, bright intensities, and other visual perceptions.

2. Description of the Prior Art

It is well known in the art to provide visual effects in images printed on sheets and plates as well as several kinds of back supports. For example, it is known to print photographic images on transparent sheets or supports generally used for public advertisements, such as the ones known as back-light advertisements. These exhibiting devices consist essentially of a close box including inner fluorescent lamps and a front translucent plate including a photographic image wherein the image is enhanced by the back lights causing the image to be more attractive to the viewer without providing, however, any visual special effect.

Other techniques employ photographic cities images generally taken during the night and the public lights of the streets are enhanced by light emitting components that are electrically fed and strategically located.

The holography is another well known technique to provide an image with visual or optical effects. The holography consists of recording several images by means of photographic tridimensional negatives for obtaining a tridimensional effect. For this purpose, during the photographic shot, the coherent-wave light beams named "laser beams" are bifurcated, wherein one of the partial beams, called the reference wave, directly impinges onto a holographic plate with the remaining part of the beams impinging over the photographed object and reflecting onto the holographic plate. Due to the different paths traveled by the beams the waves are off-set from each other therefore neutralizing or reinforcing between each other when converging onto the holographic plate. As a result of an interference spectrum is obtained for each point of the photographed object. When the holographic plate is revealed the printed object is affected by a tridimensional aspect the perception of which varies according to the angular position from which the printed support is observed.

The reproduction of holographic images is very expensive because of the equipment, materials and laboratory processes that are involved therein. In addition, the printed final product is generally obtained in small sizes.

It would be therefore convenient to have a printed product containing images that can be viewed under special visual or optical effects in a variety of sizes and back supports without requiring special and costly equipment and materials.

SUMMARY OF THE INVENTION

It is therefore one object of the present invention to provide a new method for obtained a printed product such as a photography, a brochure, a pamphlet and the like containing an image wherein the image is affected by visual or optical effects when viewed by a viewer or observer, wherein the process is carried out without requiring of special and costly photographic equipment, laboratory materials, special illumination or techniques.

It is still another object of the present invention to provide a printed product containing one or more images wherein the images are provided with special visual or optical effects when viewed by an observer, wherein the printed product may be obtained without size restrictions, with images taken in indoor or outdoor spaces.

It is a further object of the present invention to provide a printed product and a method for obtaining the same, wherein the product is enhanced by light characteristics not achieved heretofore, with the product being also provided with tridimensional sensation according to at least two focus fields that can be defined as an image focus depending on the characteristics of the taken photographic image, and a bright focus that is located in the same plane that the image focus. The particular conception of the printed images creates multiple visions when the viewer or observer moves relative to the photographic plane thus perceiving different light densities and intensities of the photographed object, preferably with higher reflection of the room light.

It is still another object of the present invention to provide a printed product including an image with visual effects and a method for obtaining the printed product, the method comprising providing a photographic image, printing the image on a front transparent sheet and adhering the transparent sheet to a light-reflecting front surface of a back support sheet for providing a visual effect resulting from the combination of the light-reflecting surface and the image.

It is a further object of the present invention to provide a printed product obtained by the above mentioned method, the product comprising a front transparent sheet provided with a photographic image and a back support sheet having a front surface with at least part of the front surface being light-reflective, wherein said transparent sheet is adhered on said front surface of the support sheet and both the at least partially light-reflective front surface of the support sheet and the transparent sheet containing the printed image are combined for providing a visual effect.

It is even another object of the present invention to provide a method for obtaining a printed image with visual effects, the method comprising providing a photographic image; printing the image on a front transparent sheet; providing a back support sheet having a front surface with at least part of the front surface being light-reflective; and adhering said transparent sheet onto said front surface, wherein both the at least partially light-reflective front surface and the image printed on the transparent sheet are combined for providing a visual effect.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
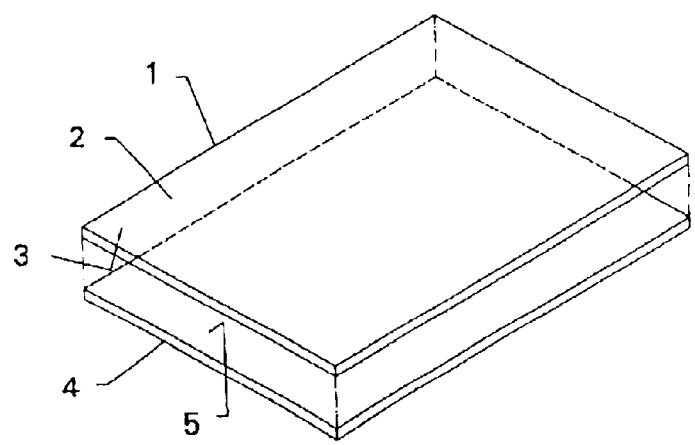
FIG. 1 shows a perspective, exploded view of a product comprising an upper or front transparent sheet or plate and a bottom or back support sheet or plate, according to a first embodiment of the invention, named "Photom-lumina" embodiment.
Figure 2:
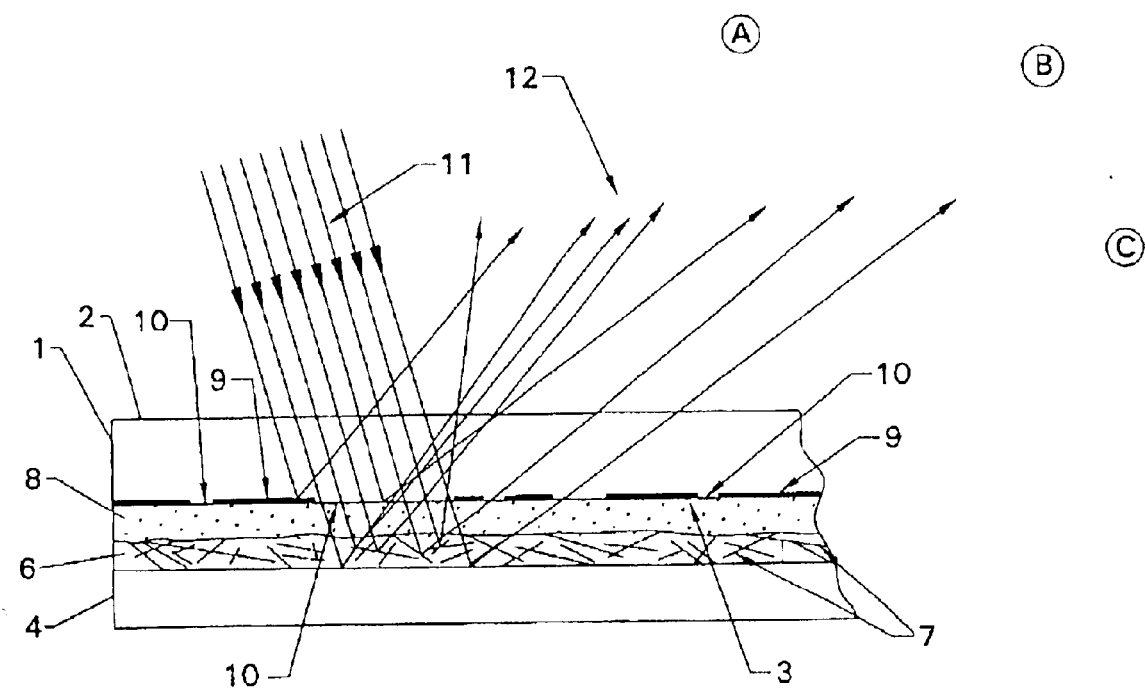
FIG. 2 shows an enlarged side elevation, cross-sectional view of the printed product of FIG. 1.

Now referring in detail to the drawings it may be seen from FIGS. 1 and 2 a printed product of the invention comprising an upper or front transparent sheet or plate 1 having a front surface 2 and a rear surface 3, with the front surface being smooth and shining or glittering and with rear surface 3 having good and higher absorption characteristics for better receiving at least one ink employed for printing an image that will be affected by special visual effects. A bottom or back support sheet or plate 4, having a front surface 5 being at least partially light-reflective, is located below plate 1, wherein sheet 4 may comprise an acetate sheet, a glass plate or an acrylic plate for the embodiment called "Photom-lumina", or a mirror Mylar sheet for the embodiment called "Photom-mirror". The use of one type or the other will provide the printed product with different visual or optical perceptive effects.

According to the invention, an image is provided preferably by revealing the negative image obtained by conventional photography, or any other technique, and the image is digitized by any well known computer programs and equipment available in the market. Then, the image is printed onto transparent film or sheet 2 by any technique known in the art, such as ink printing the digital image by an ink-injection printer, laser-printing the digital image by a laser printer, by serigraphy printing or by off-set printing. Subsequently, said transparent sheet with the printed image is adhered or fixed onto front surface 5, wherein both the at least partially light-reflective front surface and the image printed on the transparent sheet are combined for providing a visual effect.

The adhering of sheet 2 over sheet 4 may comprise applying onto front surface 5 a coating or glittering emulsion 6, FIG. 2, containing light-reflecting particles 7, also defined as glittering particles. Said particles or glitters may be silver or golden flakes or small foils, preferably circular, flat and shining elements. Depending of the density or concentration of glitters per surface unit onto surface 5, most of the glitters will be at least partially mutually overlapped forming several light-reflection angles for the impinging light, thus resulting in a tridimensional perceptive effect for any observer, depending from the angle or focus of observation. An affect known as "shining mosaic effect" is also produced.

The image may be printed at any surface 2, 3 of sheet 1 by means of an ink-jet printer or laser printer when the sheet 4 is provided with the glittering emulsion. If sheet 4 is a mirrored Mylar film and the image is printed by serigraphy, the non shining and more absorbent surface 3 of sheet 1 is employed for printing the image.

Sheet 1 is then adhered, preferably bonded, to sheet 4 by applying an adhesive onto the front surface of the support sheet, preferably by spraying an aerosol transparent siliconned glue onto the front surface of the support sheet in order to prevent the image colors from altering as time goes by. If back support sheet 4 is an acetate sheet or a glass or acrylic sheet (Photom-lumina embodiment), base sheet 4 is provided with glittering coating 6 and an adhesive layer 8, FIG. 2, is applied onto the glittering coating. If sheet 4 is a mirrored Mylar sheet, the aerosol adhesive or glue is directly applied onto the mirrored surface of the Mylar (Photom-mirror embodiment).

Alternatively, the coating may be an adhesive containing light-reflecting particles and the step of adhering said transparent sheet onto said front surface of the support sheet comprises adhering both sheets by the adhesive coating.

As it is shown in FIG. 2 corresponding to the "Photom-lumina" embodiment, the image printed on rear surface 3 comprises thicker or denser portions indicated by thicker lines 9 and less dense portions of the photographic image are indicated by thinner lines 10. Light beams 11 impinge onto the printed product and light beams 12 reflect from glitters 7. With the purpose of clearly illustrating the visual effects, the room light has been illustrated only by the impinging beams and the reflecting beams.

As may be seen, light beams 11 impinging onto denser portions 9 do not reflect and beams 11 impinging onto glittering emulsion or coating 6 are reflected by particles 7 according to several angular paths related to the angular position of the particles. The number of beams viewed by an observer depend on the position of the observer and his angular relation to the upper surface of the printed product. The several exemplary viewer positions are indicated by A, B and C in FIG. 2. Generally, the light-reflecting particles define several light angularly dispersed beams wherein the product provides different images when viewed from different angular positions. Also, the light-reflecting particles define several reflected and refracted light beams wherein the product provides different images when viewed from different angular positions.

As an example of the several views perceived by an observer, an image based in a photography taken of a landscape in a sunny day may be seen differently from points A, B and C. An observer in point A will see the clearer zones 10 of the photography, namely the zones corresponding to the objects that are clearer in the photograph shot, as the brighter zones because of the light beams, when viewing the printed product of the invention, passing through zones 10 will reflect in the glitters and will pass again back through the zones 10 towards the observer. An observer at point C will receive less reflecting beams as long as the angular position of focus C will have less access to the glittering coating through clear zones 10 and, therefore, most reflecting beams will be bared by denser zones 9 and will not reach point C. Between points A and C a spectrum of several visual effects will be perceived.

Figure 4:
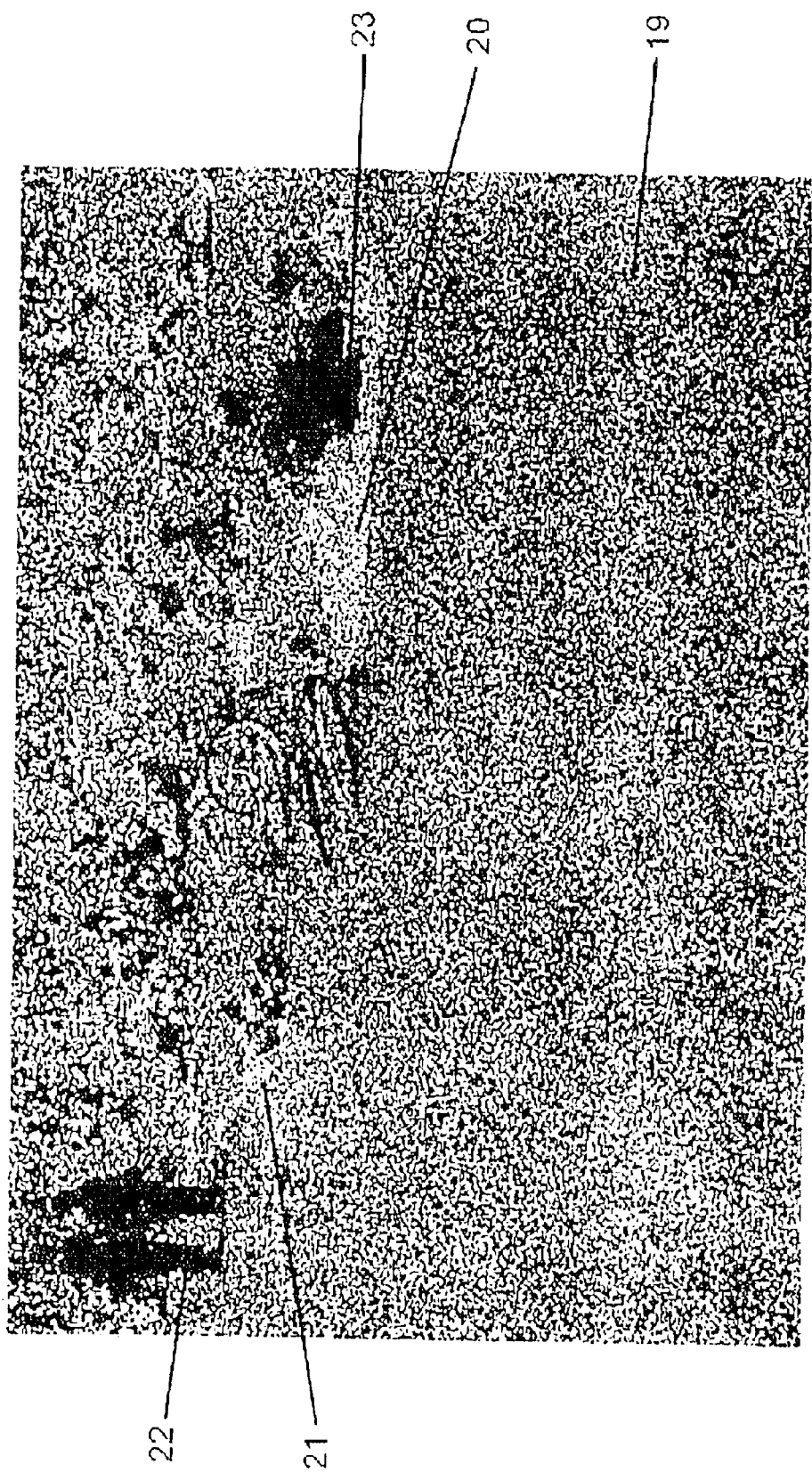
FIG. 4 shows a front view of a printed product of the invention showing a particular texture and relevance of the several intensities of the light reflected from the product, according to a determined observation point.

FIG. 4 shows an image corresponding to a recreation place, such as a park or solarium, wherein the general texture of the image is remarked and wherein at least three luminescent areas can be differentiated. Reference 19 indicates a mean luminous zone, references 20, 21 indicate high light-reflection zones and references 22, 23 indicate dark zones remarkably contrasting to the prior mentioned zones.

While FIG. 4 corresponds to an inventive photography printed product, this Figure is a drawing from which the visual effects can not be appreciated, however if the inventive printed product is viewed at several angular positions, several visual effects can be appreciated. The light impinging onto the printed product reflects in the plurality of glittering points creating different color points producing, for example, tridimensional effects and rainbow effects when viewed from different angular positions and with different light intensities. Any change in the light is immediately reflected and perceived. It is easy to note that a "net of very luminous points" is formed and the net changes according to the observation position, thus varying the visual effects.

An amplification of a photography printed according to the Photom-lumina embodiment has an increase in its definition as compared to a smaller photography, that is the contrary to what would be expected in a conventional photography. This is due to the number of luminous points per surface covered by an object, or a particular part of the object in the image, what is known as "space-image characteristic". For example, a photography of an object comprising 3000 points of luminous emulsion it is enlarged thrice, thus acquiring in the same object surface 9000 luminous points which generate the volume sensation in portions not provided with this volume effect before.

Figure 5:
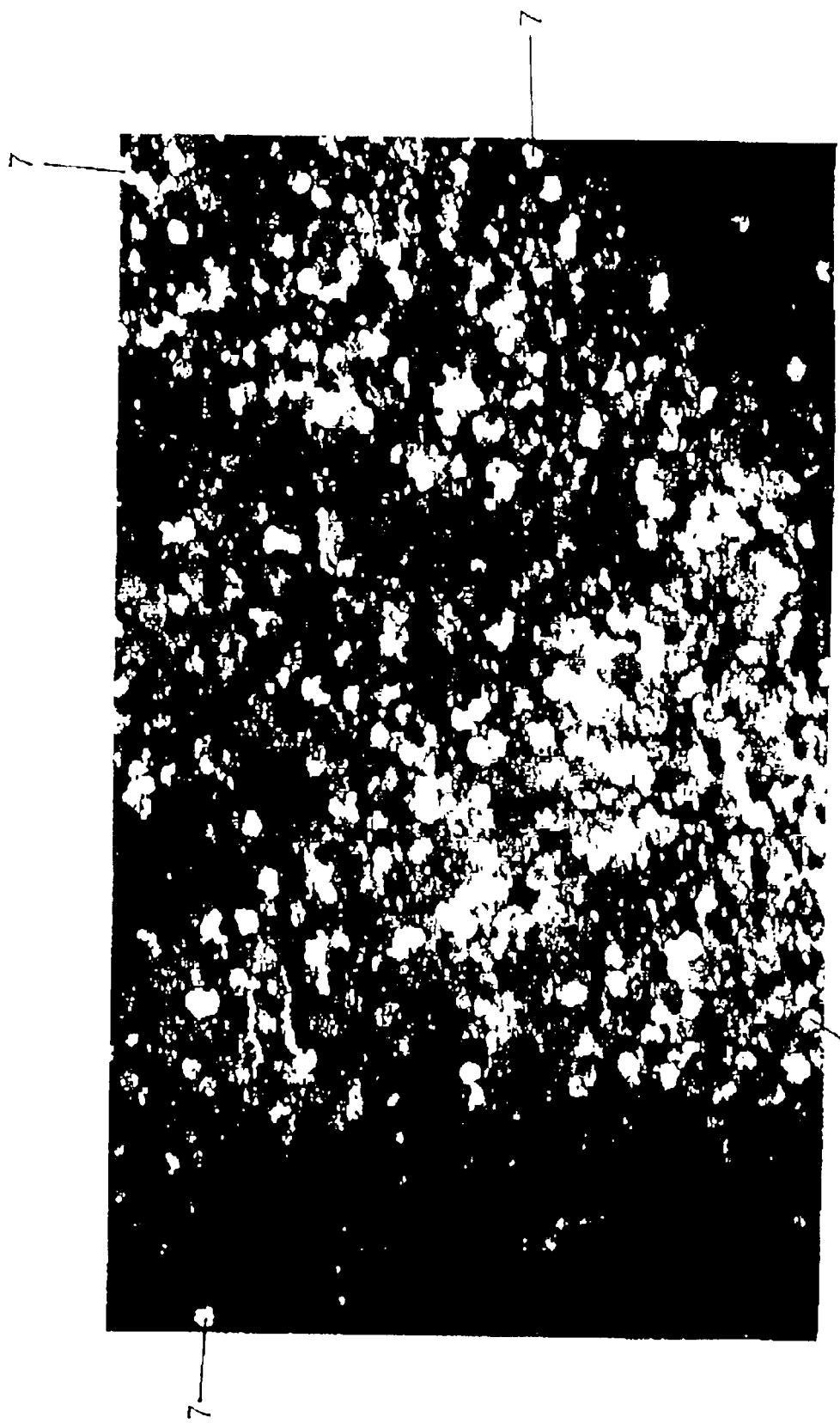
FIG. 5 shows an enlarged portion of an image according to the first embodiment of the invention, wherein zones with mean reflection, dark zones and bright zones can be appreciated, the zones being defined by a plurality of reflective elements or particles depending of the observation point.

In the enlarged detail of FIG. 5 glitters 7 may be seen which, according to the inclination thereof relative to the printed image and the observation angle, define dark zones, mean luminous zones and brighter zones, which is also depending from the ink employed for printing the photographic image.

Figure 3:
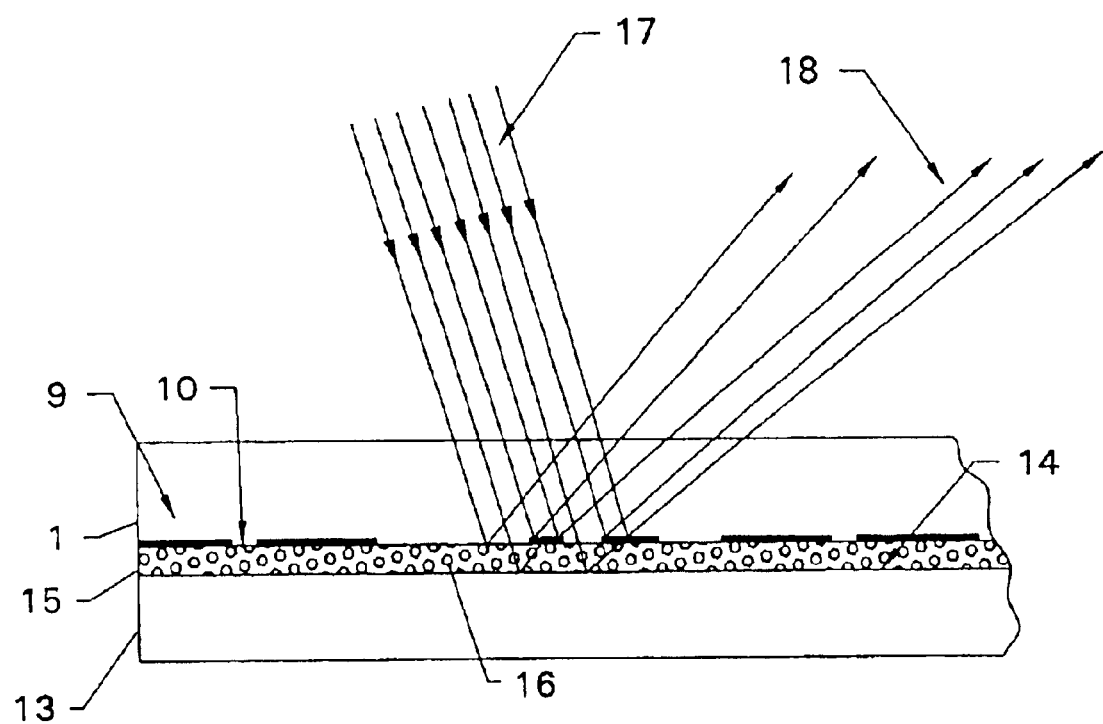
FIG. 3 shows an enlarged side elevation, cross-sectional view of the printed product according to another embodiment of the invention, named "Photom-Mirror" embodiment.

In the Photom-mirror embodiment shown in FIG. 3, sheet 4 comprises a Mylar film having a mirror surface 14 and a transparent siliconned adhesive layer 15 applied onto surface 14. Particles 16 onto surface 14 allow some light beams 17 to pass between cells formed between particles 16 which beams are then reflected in surface 14. Reflected beans are indicated by reference 18. Other beams 17 are refracted by particles 16 changing their direction of travel and forming a visual iridescent net effect providing the image with an apparent depth. In the case of refraction of beams 17 the final direction thereof will be substantially horizontal relative the image plane. As it may be seen, the number of impinging light beams 17 is less than the number of reflected beams 18 thus making clear the difference between the intensity of beams 17 and 18.

Like in the "Photom-lumina" embodiment, beam 17 is more intensively reflected in the clearer zones 10, and its reflection is less intensive in the more opaque zones or denser zones 9, just to mention extreme situations. This may be also appreciated in a "photom-mirror" embodiment provided with an iridescent bright and herein the siliconned adhesives causes the light beams coming from the mirror surface of the Mylar and the image to refract creating a visual volume and depth of field not provided in the original photography. The perception varies with the observation angle and tridimensional sensation is also provided. All what is white in this image will be seen as having a silver color and the remaining colors are more intensive.

While preferred embodiments of the present invention have been illustrated and described, it will be obvious to those skilled in the art that various changes and modifications may be made therein without departing from the scope of the invention as defined in the appended claims.

I claim:

1. A method for obtaining a printed image with visual effects, the method comprising:
   i. providing a photographic image;
   ii. printing the image on a front transparent sheet;
   iii. providing a back support sheet having a front surface with at least part of the front surface being light-reflective, and;
   iv. adhering said transparent sheet onto said front surface, wherein both the at least partially light-reflective front surface and the image printed on the transparent sheet are combined for providing a visual effect.

2. The method of claim 1, wherein the transparent sheet has a front surface and a rear surface and the step of adhering said transparent sheet onto said front surface of the support sheet comprises applying an adhesive between the rear surface of the transparent sheet and the front surface of the support sheet.

3. The method of claim 2, wherein the photographic image is printed onto the rear surface of the transparent sheet.

4. The method of claim 2, wherein the step of providing a support sheet having an at least partially light-reflective front surface comprises:
   i. providing the support sheet; and
   ii. applying onto the front surface thereof a coating containing light-reflecting particles.

5. The method of claim 4, wherein the coating is an adhesive containing light-reflecting particles and the step of adhering said transparent sheet onto said front surface of the support sheet comprises adhering both sheets by the adhesive coating.

6. The method of claim 4, wherein the transparent sheet has a front surface and a rear surface and the step of adhering said transparent sheet onto said front surface of the support sheet comprises applying an adhesive between the rear surface of the transparent sheet and the front surface of the support sheet.

7. The method of claim 4, wherein the transparent sheet has a front surface and a rear surface that is adhered to the support sheet and the photographic image is printed onto the rear surface of the transparent sheet.

8. The method of claim 2, wherein the step of applying an adhesive between the rear surface of the transparent sheet and the front surface of the support sheet comprises spraying a transparent siliconned glue onto the front surface of the support sheet.

9. The method of claim 1, wherein the step of providing a photographic image comprises providing a photographic image and digitalizing the photographic image, and the step of printing the image on a transparent sheet comprises ink printing the digital image by an ink-injection printer.

10. The method of claim 1, wherein the step of providing a photographic image comprises providing a photographic image and digitalizing the photographic image, and the step of printing the image on a transparent sheet comprises laser-printing the digital image by a laser printer.

11. The method of claim 1, wherein the step of printing the image on a transparent sheet comprises printing the image by serigraphy printing.

12. The method of claim 1, wherein the step of printing the image on a transparent sheet comprises printing the image by off-set printing.

13. A printed product obtained by the method of claim 1, the product comprising:
   i. a front transparent sheet provided with a photographic image; and
   ii. a back support sheet having a front surface with at least part of the front surface being light-reflective, wherein said transparent sheet is adhered on said front surface of the support sheet and both the at least partially light-reflective front surface of the support sheet and the transparent sheet containing the printed image are combined for providing a visual effect.

14. The product of claim 13, wherein the transparent sheet has a front surface and a rear surface adhered to said front surface of the support sheet by an adhesive.

15. The product of claim 13, wherein the at least partially light-reflective front surface of the support sheet includes a coating containing light-reflecting particles.

16. The product of claim 15, wherein the coating is an adhesive containing light-reflecting particles and the transparent sheet is adhered to said front surface of the support sheet by the adhesive coating.

17. The product of claim 14, wherein the adhesive is a transparent siliconned glue applied onto the front surface of the support sheet.

18. The product of claim 15, wherein the light-reflecting particles are at least partially overlapped defining several light-reflection angles.

19. The product of claim 13, wherein the support sheet is an acetate sheet.

20. The product of claim 13, wherein the support sheet is a glass plate.

21. The product of claim 13, wherein the support sheet is an acrylic plate.

22. The product of claim 15, wherein the light-reflecting particles define several light angularly dispersed beams wherein the product provides different images when viewed from different angular positions.

23. The product of claim 13, wherein the support sheet is a mirrored sheet.

24. The product of claim 15, wherein the light-reflecting particles define several reflected and refracted light beams wherein the product provides different images when viewed from different angular positions.

* * * * *